(12) United States Patent
Hsu et al.

(10) Patent No.: US 8,152,122 B2
(45) Date of Patent: Apr. 10, 2012

(54) FIXING MECHANISM FOR FIXING A DISPLAY DEVICE

(75) Inventors: Cheng-Hung Hsu, Taipei Hsien (TW);
Sheng-Chieh Yang, Taipei Hsien (TW);
Xiao-Ping Qiu, Taipei Hsien (TW);
Chi-Wei Kuo, Taipei Hsien (TW);
Hsueh-Ping Yang, Taipei Hsien (TW)

(73) Assignee: Wistron Corporation, Hsin-Tai-Wu Rd., Xizhi Dist., New Taipei (TW)

( * ) Notice: Subject to any disclaimer, the term of this patent is extended or adjusted under 35 U.S.C. 154(b) by 142 days.

(21) Appl. No.: 12/632,807

(22) Filed: Dec. 8, 2009

(65) Prior Publication Data

US 2010/0243832 A1 Sep. 30, 2010

(30) Foreign Application Priority Data

Mar. 24, 2009 (TW) .............................. 98109614 A

(51) Int. Cl.
*A47F 5/08* (2006.01)
(52) U.S. Cl. ......... 248/231.91; 248/222.14; 248/220.22; 248/220.41
(58) Field of Classification Search ............... 248/205.3, 248/220.41, 22.043, 222.14, 231.91, 314, 248/220.22, 73
See application file for complete search history.

(56) References Cited

U.S. PATENT DOCUMENTS

| | | | | |
|---|---|---|---|---|
| 3,030,060 A * | 4/1962 | Breuer | ......................... | 248/265 |
| 4,058,859 A * | 11/1977 | Arrowood | ...................... | 4/252.3 |
| 4,258,961 A * | 3/1981 | Ackeret | ....................... | 312/111 |
| 4,363,459 A * | 12/1982 | Holzer | ........................ | 248/265 |
| 4,623,113 A * | 11/1986 | Studebaker | ............... | 248/311.2 |
| 4,895,331 A * | 1/1990 | Nehls | ........................ | 248/245 |
| 4,907,771 A * | 3/1990 | Wang | ........................ | 248/222.14 |
| 5,073,681 A * | 12/1991 | Hubben et al. | .................. | 174/66 |
| 5,154,385 A * | 10/1992 | Lindberg et al. | ......... | 248/225.11 |
| 5,368,267 A * | 11/1994 | Howard | .................. | 248/231.41 |
| 5,822,918 A * | 10/1998 | Helfman et al. | .................. | 47/39 |
| 6,129,221 A * | 10/2000 | Shaha | ........................ | 211/87.01 |
| 6,367,756 B1 * | 4/2002 | Wang | ........................ | 248/278.1 |
| 6,549,412 B1 * | 4/2003 | Ma | ............................. | 361/704 |
| 6,697,250 B2 | 2/2004 | Kuo | | |
| 6,953,894 B2 * | 10/2005 | Ungerman et al. | ............. | 174/58 |
| 7,309,053 B2 * | 12/2007 | Lin | ........................ | 248/476 |
| 7,451,956 B2 * | 11/2008 | Bohlen | ........................ | 248/265 |
| 7,455,271 B2 * | 11/2008 | Pincek et al. | ............. | 248/288.31 |
| 7,537,429 B2 * | 5/2009 | Xia et al. | ........................ | 415/119 |
| 7,726,617 B2 * | 6/2010 | Zambelli et al. | ......... | 248/288.31 |
| 2004/0173485 A1 * | 9/2004 | Huang | ........................ | 206/349 |
| 2007/0237602 A1 * | 10/2007 | Xia et al. | ...................... | 411/178 |
| 2011/0095141 A1 * | 4/2011 | Hsieh | .............................. | 248/73 |

* cited by examiner

*Primary Examiner* — Terrell McKinnon
*Assistant Examiner* — Daniel J Breslin
(74) *Attorney, Agent, or Firm* — Winston Hsu; Scott Margo

(57) ABSTRACT

A fixing mechanism for fixing a display device is disclosed. The fixing mechanism includes a housing whereon a first hole and a protrusion are formed, and a bracket installed on a side of the housing. The bracket includes a connecting part for connecting the housing. A second hole and an opening are formed on the connecting part, and the protrusion passes through the opening. The bracket further includes a bending part connected to the connecting part for shielding the second hole. The fixing mechanism further includes a fastening component passing through the first hole on the housing and the second hole on the connecting part for fastening the bracket on the housing.

14 Claims, 4 Drawing Sheets

FIXING MECHANISM FOR FIXING A DISPLAY DEVICE

BACKGROUND OF THE INVENTION

1. Field of the Invention

The present invention relates to a fixing mechanism for fixing a display, and more particularly, to a fixing mechanism for fixing a display with a simply structure and without utilizing rivets.

2. Description of the Prior Art

In an advanced technology, cathode ray tube (CRT) displays are replaced completely and flat-panel displays (FPD) are main products in a display market. In contrast to huge volume of the conventional cathode ray tube displays, the flat-panel displays have advantages of low power consumption, low radiation, and miniaturized volume. At this time, expansion of dimensions of the flat-panel displays popularizes the miniaturized flat-panel displays in the display market, such as in a domestic display, in an outdoor advertisement, and in an exhibition. A wall-mounted structure is applied for supporting the display on a wall. While setting the wall-mounted structure, the wall-mounted structure and the display need to be combined closely so that the display can be positioned on the wall stably. However, the conventional wall-mounted structure for LCD TV or LCD display utilizes rivets by a steel plate or an iron plate as main fixing structure, and it has disadvantages of high cost, complicated manufacturing process, and difficult assembly so as to affect production efficiency.

SUMMARY OF THE INVENTION

According to the claimed invention, a fixing mechanism for fixing a display device is disclosed. The fixing mechanism includes a housing whereon a first hole and a protrusion are formed, and a bracket installed on a side of the housing. The bracket includes a connecting part for connecting the housing. A second hole and an opening are formed on the connecting part, and the protrusion passes through the opening. The bracket further includes a bending part connected to the connecting part for shielding the second hole. The fixing mechanism further includes a fastening component passing through the first hole on the housing and the second hole on the connecting part for fastening the bracket on the housing.

According to the claimed invention, the protrusion is made of plastic material.

According to the claimed invention, the protrusion is connected with the connecting part in a heat melt manner.

According to the claimed invention, the connecting part is glued to the housing.

According to the claimed invention, the bracket is made of metal material.

According to the claimed invention, the connecting part and the bending part are formed as an U-shaped structure substantially.

According to the claimed invention, the connecting part and the bending part are integrated monolithically.

According to the claimed invention, an indentation is formed on the bending part and located in a position corresponding to the opening on the connecting part.

According to the claimed invention, the fastening component is a screw, and the first hole and the second hole are threaded holes.

According to the claimed invention, the fixing mechanism further includes a wall mount installed on the other side of the housing. A third hole is formed on the wall mount, and the fastening component passes through the third hole on the wall mount, the first hole on the housing, and the second hole on the connecting part for fastening the wall mount on the housing.

According to the claimed invention, the fastening component is a screw, and the first hole, the second hole, and the third hole are threaded holes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
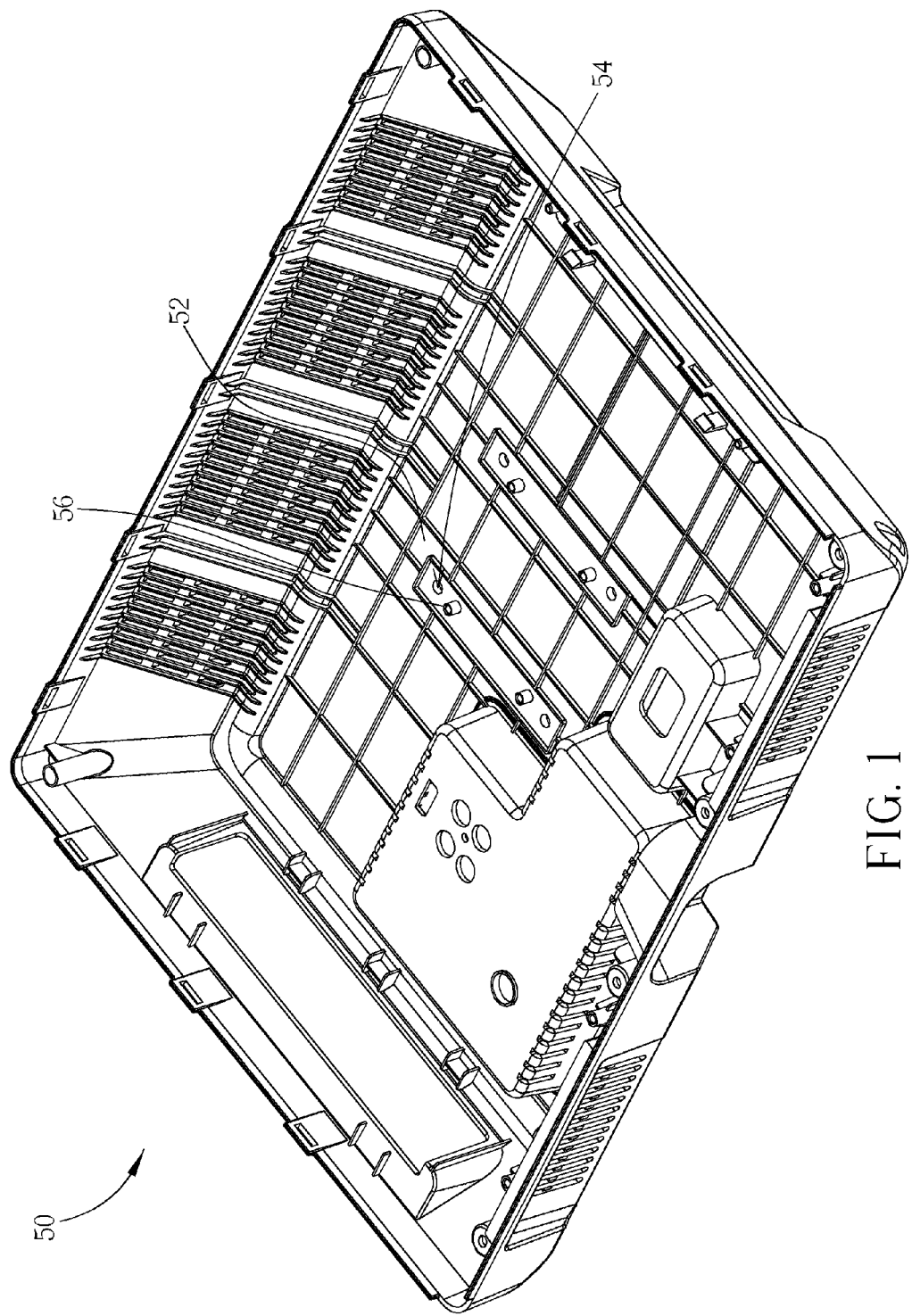
FIG. 1 is a diagram of a housing of a fixing mechanism according to a preferred embodiment of the present invention.
Figure 2:
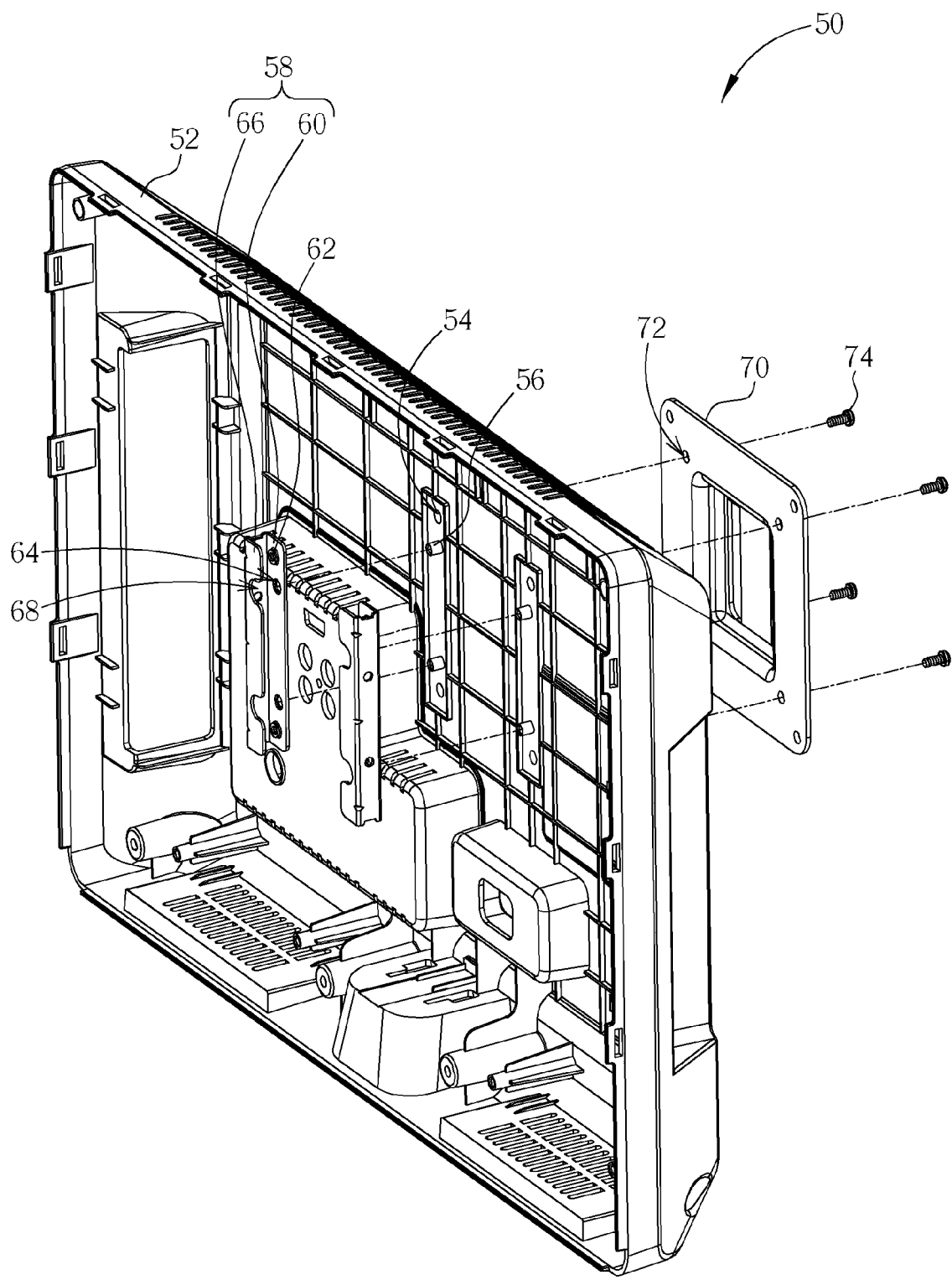
FIG. 2 and FIG. 3 are exploded diagrams of the fixing mechanism at different views according to the preferred embodiment of the present invention.
Figure 3:
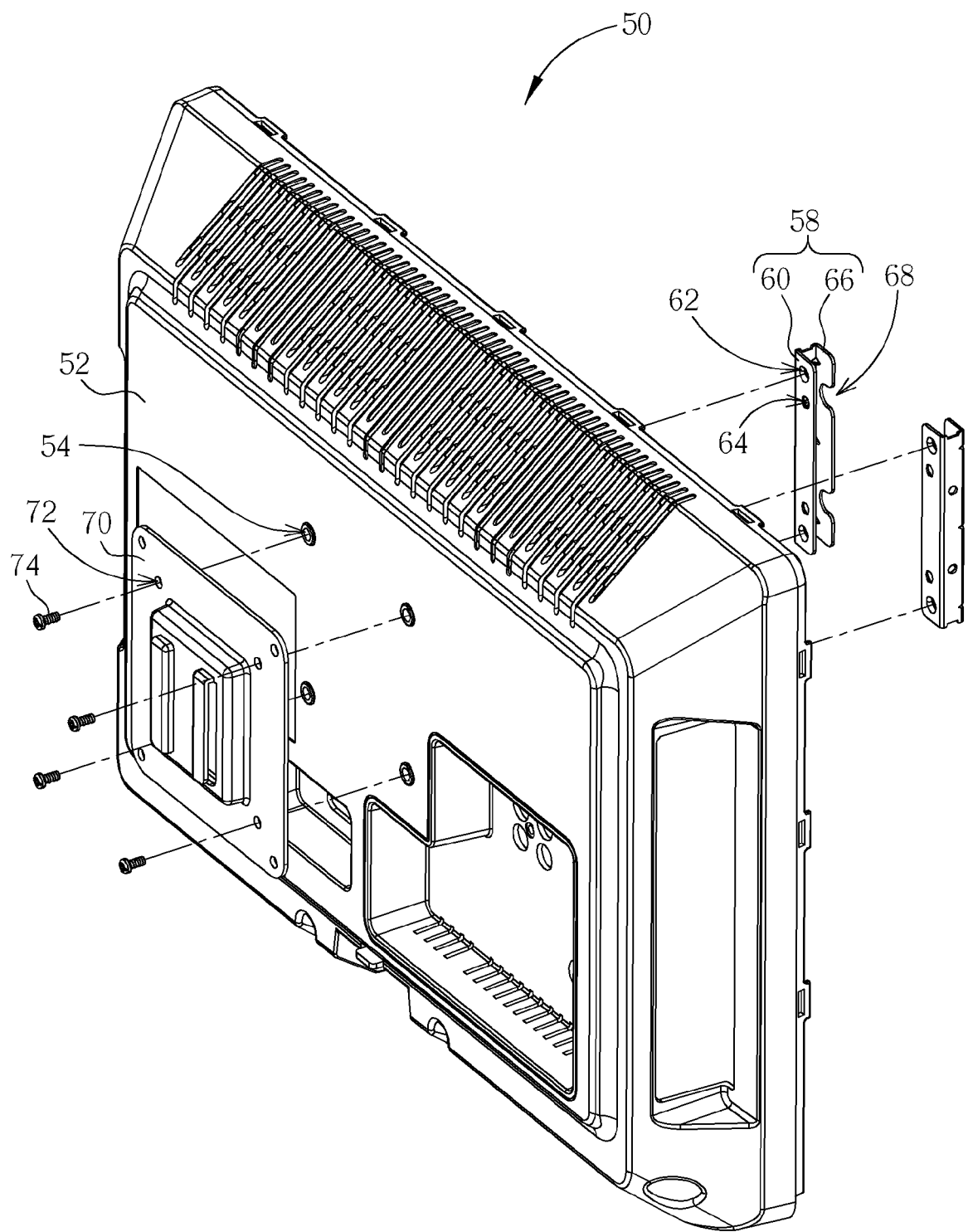
Figure 4:
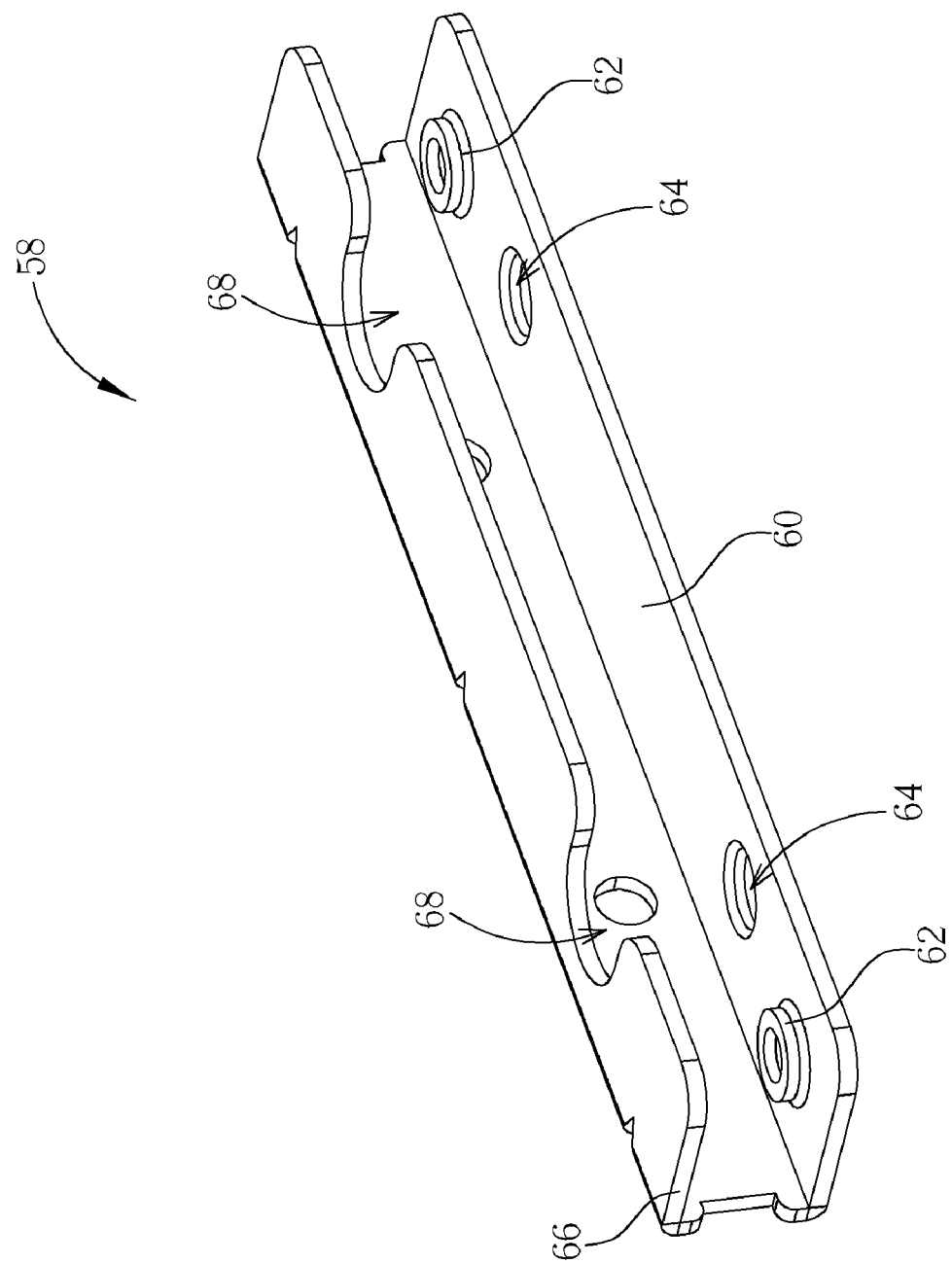
FIG. 4 is a diagram of a bracket according to the preferred embodiment of the present invention.

Please refer to FIG. 1 to FIG. 3. FIG. 1 is a diagram of a housing 52 of a fixing mechanism 50 according to a preferred embodiment of the present invention. FIG. 2 and FIG. 3 are exploded diagrams of the fixing mechanism 50 at different views according to the preferred embodiment of the present invention. The fixing mechanism 50 includes the housing 52 whereon at least one first hole 54 and at least one protrusion 56 are formed. The protrusion 56 can be made of plastic material. The fixing mechanism 50 further includes a bracket 58 installed on a side of the housing 52. Please refer to FIG. 4. FIG. 4 is a diagram of the bracket 58 according to the preferred embodiment of the present invention. The bracket 58 includes a connecting part 60 for connecting the housing 52. At least one second hole 62 and at least one opening 64 are formed on the connecting part 60. The second hole 62 is located corresponding to the first hole 54, and the opening 64 is located corresponding to the protrusion 56 of the housing 52. The protrusion 56 of the housing 52 is for passing through the opening 64. The bracket 58 further includes a bending part 66 connected to the connecting part 60 for shielding the second hole 62. At least one indentation 68 is formed on the bending part 66 and located in a position corresponding to the opening 64 on the connecting part 60. The connecting part 60 and the bending part 66 can be formed as an U-shaped structure substantially. The connecting part 60 and the bending part 66 can be integrated monolithically. The bracket 58 can be made of metal material, such as a steel plate, an iron plate, and so on. The bracket 58 can be formed as a stamped member.

As for combination of the bracket 58 and the housing 52, the protrusion 56 of the housing 52 can be connected with the opening 64 of the connecting part 60 in a heat melt manner. The fixture can size the connecting part 60 in the heat melt process via the indentation 68 located corresponding to the opening 64 on the bending part 66. Besides, the connecting part 60 can be glued to the housing 52, such as being attached on the housing 52 by adhesive. Any means for fixing the bracket 58 on the housing 52 is within the scope of the present invention.

The fixing mechanism further includes a wall mount 70 installed on the other side of the housing 52 for mounting a display on a wall. At least one third hole 72 is formed on the wall mount 70 and located in a position corresponding to the first hole 54 on the housing 52 and the second hole 62 on the connecting part 60. The fixing mechanism 50 further includes a fastening component 74, such as screws, for passing through the third hole 72 on the wall mount 70, the first hole 54 on the housing 52, and the second hole 62 on the connecting part 60 for fastening the wall mount 70 and the connecting part 60 on the housing 52. The fastening component 74 can be a screw, and the first hole 54, the second hole 62, and the third hole 72 can be threaded holes accordingly. An extruding hole can be provided for a self-tapping screw to from a thread on the bracket 58. The fastening mechanism of the present invention replaces conventional steel rivets or iron rivets so as to reduce material and assembling cost and to increase production efficiency. The combination of the bracket 58, the housing 52, and the wall mount 70 can provide structural strength of the wall-mounted display mounted by the wall mount 70. Furthermore, the bending part 66 of the bracket 58 can shield the second hole 62 on the connecting part 60 for protecting internal components when fastening the fastening component 74 to the connecting part 60.

In contrast to the prior art, the fixing mechanism of the present invention has advantages of low material and assembling cost and of easy manufacturing and assembling process so as to increase production efficiency effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixing mechanism for fixing a display device, the fixing mechanism comprising:
    a housing whereon a plurality of first holes and a plurality of protrusions are formed;
    a first bracket installed on a side of the housing, the first bracket comprising:
        a first connecting part for connecting the housing, a second hole and an opening being formed on the first connecting part, and one of the protrusions passing through the opening of the first connecting part; and
        a first bending part connected to the first connecting part for shielding the second hole of the first connecting part;
    a second bracket installed on the side of the housing, the second bracket comprising:
        a second connecting part for connecting the housing, a second hole and an opening being formed on the second connecting part, and another one of the protrusions passing through the opening of the second connecting part; and
        a second bending part connected to the second connecting part for shielding the second hole of the second connecting part; and
    a first fastening component and a second fastening component, respectively, passing through the first holes on the housing and the second holes on the first connecting and second connecting parts for fastening the first bracket and the second bracket on the housing;
    wherein a first slot is formed by the first connecting part and the first bending part, a second slot is formed by the second connecting part and the second bending part, and the first slot and the second slot face each other.

2. A fixing mechanism for fixing a display device, the fixing mechanism comprising:
    a housing whereon a plurality of first holes are formed;
    a first bracket installed on a side of the housing, the first bracket comprising:
        a first connecting part for connecting the housing, a second hole formed on the first connecting part; and
        a first bending part connected to the first connecting part for shielding the second hole of the first connecting part;
    a second bracket installed on the side of the housing, the second bracket comprising:
        a second connecting part for connecting the housing, a second hole formed on the second connecting part; and
        a second bending part connected to the second connecting part for shielding the second hole of the second connecting part; and
    a first fastening component and a second fastening component, respectively, passing through the first holes on the housing and the second holes on the first connecting and second connecting parts for fastening the first bracket and the second bracket on the housing;
    wherein a first slot is formed by the first connecting part and the first bending part, a second slot is formed by the second connecting part and the second bending part, and the first slot and the second slot face each other.

3. A fixing mechanism for fixing a display device, the fixing mechanism comprising:
    a housing whereon a first hole and a protrusion are formed;
    a bracket installed on a side of the housing, the bracket comprising:
        a connecting part for connecting the housing, a second hole and an opening being formed on the connecting part, and the protrusion passing through the opening; and
        a bending part connected to the connecting part for shielding the second hole;
    a wall mount installed on the other side of the housing, a third hole being formed on the wall mount; and
    a fastening component sequentially passing through the third hole on the wall mount, the first hole on the housing and the second hole on the connecting part for fastening the bracket and the wall mount on the housing.

4. The fixing mechanism of claim 3 wherein the protrusion is made of plastic material.

5. The fixing mechanism of claim 3 wherein the protrusion is connected with the connecting part in a heat melt manner.

6. The fixing mechanism of claim 3 wherein the connecting part is glued to the housing.

7. The fixing mechanism of claim 3 wherein the bracket is made of metal material.

8. The fixing mechanism of claim 3 wherein the connecting part and the bending part are formed as an U-shaped structure substantially.

9. The fixing mechanism of claim 3 wherein the connecting part and the bending part are integrated monolithically.

10. The fixing mechanism of claim 3 wherein an indentation is formed on the bending part and located in a position corresponding to the opening on the connecting part.

11. The fixing mechanism of claim 3 wherein the fastening component is a screw, and the first hole and the second hole are threaded holes.

12. The fixing mechanism of claim 3, wherein the fastening component is a screw, and the first hole, the second hole, and the third hole are threaded holes.

13. The fixing mechanism of claim 3, wherein the wall mount is for mounting the display on a vertical surface.

14. The fixing mechanism of claim 3, wherein one surface of the connecting part is physically contacted with the housing.

* * * * *